(12) United States Patent
Esmersoy

(10) Patent No.: US 8,901,931 B2
(45) Date of Patent: Dec. 2, 2014

(54) ELECTROMAGNETIC SURFACE-TO-BOREHOLE LOOK AROUND SYSTEMS AND METHODS OF MONITORING IN HORIZONTAL WELLS

(75) Inventor: Cengiz Esmersoy, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 586 days.

(21) Appl. No.: 13/255,653

(22) PCT Filed: Mar. 12, 2010

(86) PCT No.: PCT/US2010/027205
§ 371 (c)(1),
(2), (4) Date: Nov. 14, 2011

(87) PCT Pub. No.: WO2010/105206
PCT Pub. Date: Sep. 16, 2010

(65) Prior Publication Data
US 2012/0056623 A1    Mar. 8, 2012

Related U.S. Application Data

(60) Provisional application No. 61/160,111, filed on Mar. 13, 2009.

(51) Int. Cl.
G01V 3/00      (2006.01)
G01V 9/02      (2006.01)
G01V 3/28      (2006.01)

(52) U.S. Cl.
CPC .. G01V 3/28 (2013.01); G01V 9/02 (2013.01); G01V 3/00 (2013.01)
USPC ............ 324/332; 324/333; 324/334; 324/337; 324/338; 324/375; 73/152.01; 73/152.62; 702/6; 702/7; 702/11; 702/12; 702/13; 367/15; 367/17; 367/18; 367/25; 367/131

(58) Field of Classification Search
CPC .................................. G01V 9/02; G01V 3/28
USPC .................. 324/323–375; 73/152.01–152.62; 702/6, 7, 11, 12, 13; 367/15, 17, 18; 367/25, 131
See application file for complete search history.

(56) References Cited

U.S. PATENT DOCUMENTS 3,851,171 A * 11/1974 Saniford et al. ............... 250/259
4,532,618 A *  7/1985 Wener ............................ 367/46
(Continued)

FOREIGN PATENT DOCUMENTS

WO        2005085909 A1     9/2005
WO     WO2007/056278   *   5/2007
(Continued)

OTHER PUBLICATIONS

Bryant, et al., "Utility and Reliability of Cemented Resistivity Arrays in Monitoring Waterflood of the Mansfield Sandstone, Indiana, USA", SPE 71710—SPE Annual Technical Conference and Exhibition, New Orleans, Louisiana, 2011, 16 pages.

*Primary Examiner* — Patrick Assouad
*Assistant Examiner* — Lamarr Brown

(57) ABSTRACT

A method for water monitoring about a deviated well is disclosed. The method includes positioning a series of electromagnetic (EM) receivers in a completed deviated wellbore, said receivers being spaced along substantially the length of the well located in a region of a reservoir to be monitored. The method also includes positioning an electromagnetic (EM) source at a first Earth surface location. Then the EM source is activated for a first survey measurement of the reservoir, and an EM field detected at each EM receiver is recorded. The EM source is moved to a second Earth surface location, and activated for a second survey measurement of the reservoir, and an EM field detected at each EM receiver is recorded. From the first and second survey measurements at each of the receivers, an inversion is performed to determine position of water about (and specifically below) the horizontal well.

8 Claims, 3 Drawing Sheets

(56) References Cited

U.S. PATENT DOCUMENTS

| | | | |
|---|---|---|---|
| 5,495,175 A * | 2/1996 | Ramirez et al. | 324/357 |
| 5,652,519 A | 7/1997 | Warren et al. | |
| 5,878,372 A * | 3/1999 | Tabarovsky et al. | 702/7 |
| 6,462,549 B1 * | 10/2002 | Curtis et al. | 324/323 |
| 6,611,762 B1 * | 8/2003 | Gao | 702/7 |
| 6,920,082 B2 * | 7/2005 | Tang | 367/31 |
| 7,114,580 B1 * | 10/2006 | Balogh | 175/45 |
| 7,126,338 B2 * | 10/2006 | MacGregor et al. | 324/334 |
| 8,190,368 B2 * | 5/2012 | Bespalov | 702/7 |
| 8,200,437 B2 * | 6/2012 | Davydycheva et al. | 702/7 |
| 8,310,239 B2 | 11/2012 | Zhang et al. | |
| 8,400,159 B2 | 3/2013 | Gao et al. | |
| 2003/0050759 A1 * | 3/2003 | Srnka et al. | 702/7 |
| 2003/0075326 A1 * | 4/2003 | Ebinger | 166/297 |
| 2003/0105591 A1 * | 6/2003 | Hagiwara | 702/7 |
| 2003/0117142 A1 * | 6/2003 | Amini | 324/339 |
| 2004/0019427 A1 * | 1/2004 | San Martin et al. | 702/6 |
| 2005/0022995 A1 * | 2/2005 | Martin et al. | 166/311 |
| 2005/0261835 A1 * | 11/2005 | Wang | 702/6 |
| 2008/0094066 A1 * | 4/2008 | Watts | 324/337 |
| 2008/0128128 A1 * | 6/2008 | Vail et al. | 166/250.15 |
| 2008/0196902 A1 * | 8/2008 | Head | 166/381 |
| 2008/0223579 A1 * | 9/2008 | Goodwin | 166/302 |
| 2009/0005992 A1 | 1/2009 | Alumbaugh et al. | |
| 2009/0039889 A1 | 2/2009 | Wilt et al. | |
| 2009/0091328 A1 * | 4/2009 | Clark et al. | 324/338 |
| 2009/0204327 A1 * | 8/2009 | Lu et al. | 702/7 |
| 2009/0236145 A1 * | 9/2009 | Bennett et al. | 175/24 |
| 2009/0254282 A1 * | 10/2009 | Bespalov | 702/7 |
| 2009/0261832 A1 * | 10/2009 | DePavia et al. | 324/338 |
| 2009/0266609 A1 * | 10/2009 | Hall et al. | 175/45 |
| 2010/0198519 A1 * | 8/2010 | Wilt et al. | 702/7 |
| 2010/0231220 A1 | 9/2010 | Alumbaugh et al. | |
| 2010/0256916 A1 * | 10/2010 | Liu et al. | 702/11 |
| 2010/0259267 A1 | 10/2010 | Rosthal et al. | |
| 2010/0321023 A1 | 12/2010 | Gao et al. | |
| 2012/0130641 A1 * | 5/2012 | Morrison et al. | 702/7 |
| 2012/0319691 A1 * | 12/2012 | Brune et al. | 324/326 |
| 2013/0054145 A1 * | 2/2013 | Bittar et al. | 702/7 |

FOREIGN PATENT DOCUMENTS

| | | |
|---|---|---|
| WO | 2009002763 A1 | 12/2008 |
| WO | 2009076066 A2 | 6/2009 |

\* cited by examiner

ELECTROMAGNETIC SURFACE-TO-BOREHOLE LOOK AROUND SYSTEMS AND METHODS OF MONITORING IN HORIZONTAL WELLS

CROSS-REFERENCE TO OTHER APPLICATIONS

This application claims priority to and the benefit of U.S. Provisional Application No. 61/160,111, entitled "Surface to Borehole EM Look Around in Horizontal Wells," filed Mar. 13, 2009, which is hereby incorporated by reference.

TECHNICAL FIELD

The invention relates generally to the field of electromagnetic logging and particularly to systems and methods for monitoring water movement in a reservoir by using a permanently installed array of electromagnetic (EM) receivers in a horizontal well, and an EM source at the Earth's surface.

BACKGROUND

In the oil industry, electromagnetic (EM) induction surveys are used to map the electrical conductivity of geologic formations between boreholes and/or radially away from a single wellbore. The latter, usually referred to as induction logging, has been in routine use for over fifty years.

The various types of induction surveys typically share many commonalities. A transmitter, usually a multi-turn coil of wire, carries an alternating current of frequency ω (radians/sec). This creates a time-varying magnetic field in the surrounding formation that in turn, by Faraday's law, induces an electromotive force (emf). This emf drives currents in the formation that are basically proportional to the formation conductivity. Finally, a receiver is positioned either in the same hole as the transmitter, in another hole, or on the surface (land or seafloor), and measures the magnetic field arising from the transmitter and the secondary or induced currents in the formation. Conventional induction logging always uses a combination of multiple receivers and/or multiple transmitters connected in series so as to cancel the mutual signal in air. In general, a theoretical model for a logging system embedded in a formation of arbitrary resistivity is used to match or interpret the received signals. In some applications, the absolute value of the average formation resistivity is not as important as the ability to map variations of resistivity within the formation. To determine this spatial variation of formation resistivity, the surveys typically involve placing the transmitter at multiple locations in the hole and measuring the fields at multiple receiver locations for each transmitter location.

Surface to borehole EM (as well as borehole to surface configuration) surveys have been described in detail in applications commonly owned with the present application, including:

U.S. patent application Ser. No. 12/719,730 filed Mar. 8, 2010, entitled "Electromagnetic Detection of Base of Salt While Drilling", U.S. patent application Ser. No. 12/581,947 filed Oct. 20, 2009 entitled "Detecting Electrical Current in a Magnetic Structure", U.S. patent application Ser. No. 12/641,944 filed Dec. 18, 2009, entitled "Correction Factors For Electromagnetic Measurements Made through Conductive Material", U.S. patent application Ser. No. 12/641,898 filed Dec. 18, 2009, entitled "Attenuation of Electromagnetic Signals Passing Through Conductive Material", U.S. patent application Ser. No. 12/603,053 filed Oct. 21, 2009, entitled "Electromagnetic Logging Between Borehole and Surface", and U.S. patent application Ser. No. 12/405,214 filed Mar. 16, 2009, entitled "Casing Correction in Non-magnetic Casing by the Measurement of the Impedance of a Transmitter or Receiver".

Each of the above shares a common assignee with the present application, and is incorporated herein by reference in its entirety.

Water encroachment in horizontal wells is a well known problem. An induction logging system that will measure, monitor, a waterfront approaching a producer would provide useful information in management of production and reservoir. Typically electrical resistivities of water and hydrocarbons are significantly different, and electromagnetic (EM) measurements are very sensitive to these resistivity changes.

Crosswell EM measurements, where an EM source is placed in one well and an EM receiver is placed in another, have been used to map resistivities between two wells and monitor movement of water. EM techniques are ideal for monitoring recovery/production processes compared with seismic surveying techniques, because of the large-scale fluid and heat flow. The accuracy of cross-well surveys decreases as the distance between wells is larger, though under certain circumstances Schlumberger's cross-well system has been proven to determine the resistivity distribution between wells spaced up to 1000 m apart. Heretofore, surface-to-borehole EM surveys have been insufficiently sensitive to deep-seated resistivity changes.

SUMMARY

In one aspect, the invention relates to a method for water monitoring about a deviated well is disclosed. The method includes positioning a series of electromagnetic (EM) receivers in a completed deviated wellbore, said receivers being spaced along substantially the length of the well located in a region of a reservoir to be monitored. The method also includes positioning an electromagnetic (EM) source at a first Earth surface location. Then the EM source is activated for a first survey measurement of the reservoir, and an EM field detected at each EM receiver is recorded. The EM source is moved to a second Earth surface location, and activated for a second survey measurement of the reservoir, and an EM field detected at each EM receiver is recorded. From the first and second survey measurements at each of the receivers, an inversion is performed to determine position of water about (and specifically below) the horizontal well.

Other or alternative features will become apparent from the following description, from the drawings, and from the claims.

DETAILED DESCRIPTION

In the following description, numerous details are set forth to provide an understanding of the present disclosure. However, it will be understood by those skilled in the art that the present invention may be practiced without these details and that numerous variations or modifications from the described embodiments are possible.

The following terms have a specialized meaning in this disclosure. While many are consistent with the meanings that would be attributed to them by a person having ordinary skill in the art, the meanings are also specified here.

Figure 1:
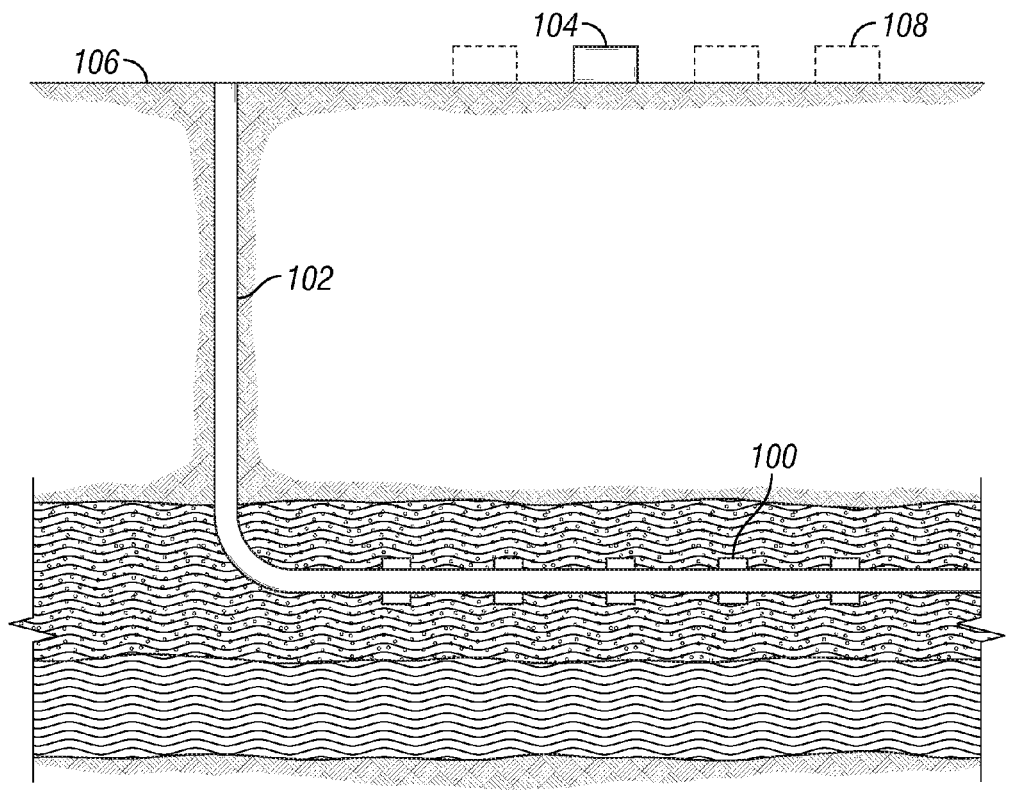
FIG. 1 shows a surface-to-borehole EM survey geometry for a horizontal well, in accordance with embodiments of the present disclosure.

The advantages of the surface-to-borehole method applied to horizontal wells are that it does not require two boreholes and that the images are not limited to the plane between wells. This disclosure aims to describe a survey similar to our previous cross-well surveys, but by using an EM source at the surface and an EM receiver in a horizontal well as shown in FIG. 1.

A series of EM receivers 100 are located along the substantially horizontal (or deviated) portion of a completed well 102. These receivers 100 can be deployed together with the completion, on the outside of a screen for example as shown in the figure, or can be deployed afterwards using various wireline tool deployment techniques, such as tractors, coiled tubing, or drill pipe.

A source 104 at the surface 106 is placed at various locations 108 and for each source location 108, the source 104 is activated and the EM field is recorded at all receivers 100. For the next source location 108, activation and recordation for all receivers 100 is repeated.

Figure 2:
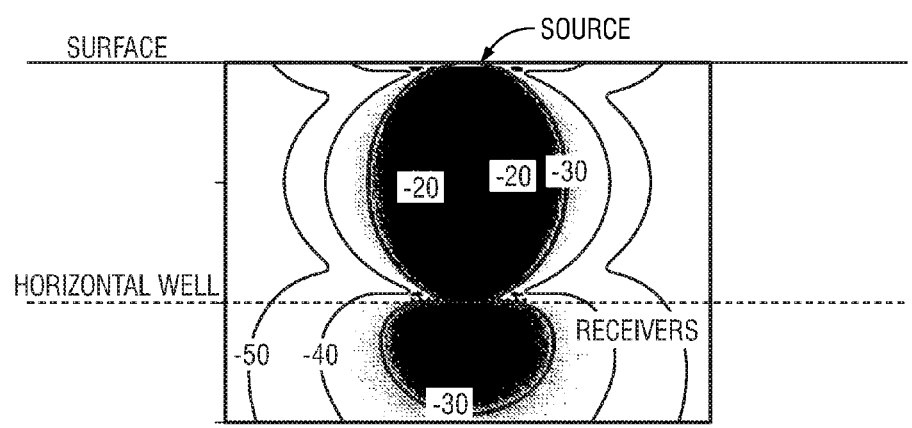
FIG. 2 shows the region of sensitivity for a measurement with one source position and one receiver, in accordance with embodiments of the present disclosure.

FIG. 2 shows the region of sensitivity for a measurement with one source position and one receiver. The shown region of sensitivity means that the measured EM field at this receiver position is sensitive to resistivities within this zone with color and contour lines indicating the degree of sensitivity. The plot indicates that the measurement is highly sensitive to the water below the horizontal well as depicted in FIG. 1.

The position of the conductive water, which is usually highly with respect to the receivers, influences the measured EM field. Measurements at other receivers, located along the horizontal well, are sensitive to the zones below them. This extends the zone of sensitivity along the substantially the entire length of the horizontal well. From these measurements, one could obtain or invert the position of the water around the horizontal well using techniques well known to those of ordinary skill in the art such as those methods described in the related art noted above for use on crosswell EM inversion, each of which is assigned to the assignee of the present application. Furthermore, the survey is repeated along many lateral source position at the surface providing partly redundant data and better coverage for inversion.

Optionally, the whole survey is repeated at certain intervals to monitor the movement of the water. Time-lapse measurement has another advantage: as the water moves in the reservoir due to production and injection at time scales from weeks to years, the conductivity of the reservoir below and around the horizontal well changes, often dramatically. However, in the zone between the horizontal well and the surface (overburden), there are typically no moving conductive fluids. Conductivity in the zone between the horizontal well and the surface remains substantially unchanged between the time-lapse repeat surveys. Consequently, the changes in the measured EM field between repeat surveys come predominantly from the movement of the water in the reservoir—which of the objective of the monitoring survey.

Figure 3:
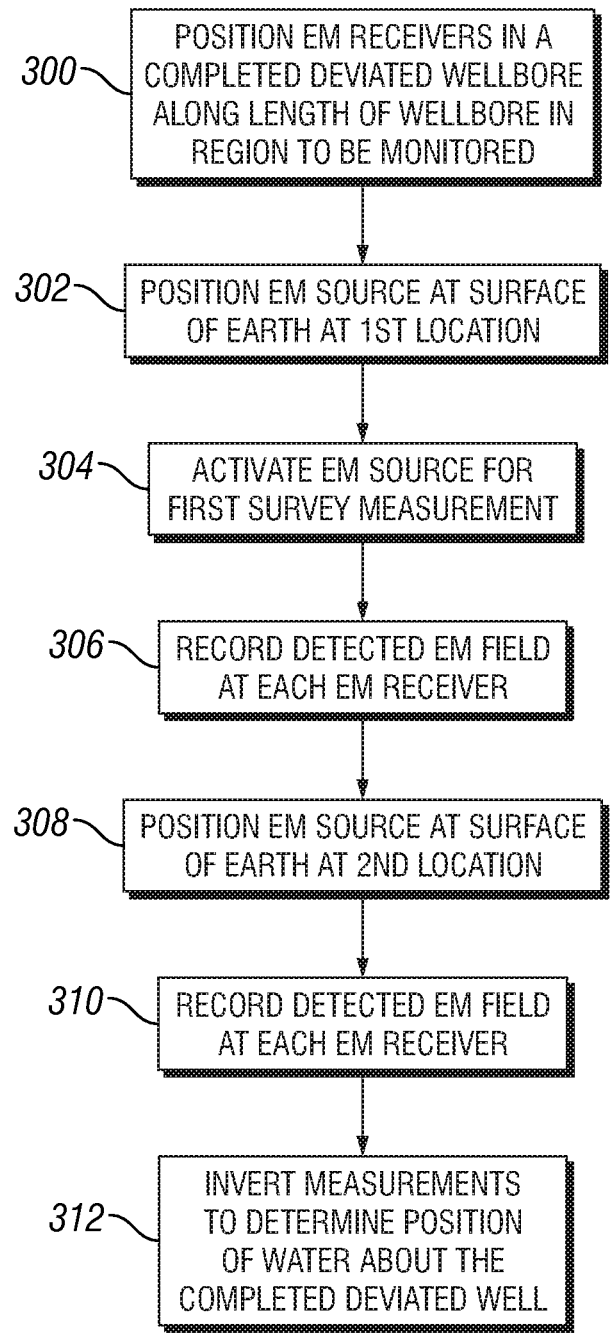
FIG. 3 shows a flowchart of one method for EM surface-to-borehole monitoring look-around in a completed, deviated wellbore, in accordance with embodiments of the present disclosure.

FIG. 3 shows a flower chart of one method for EM surface-to-borehole monitoring look-around in a completed, deviated wellbore, in accordance with embodiments of the present disclosure. Starting with block 300, EM receivers are positioned (i.e., installed permanently or deployed via a wireline tool deployment technique) in a completed, deviated wellbore along a length of wellbore in the region to be monitored. Preferably, the EM receivers are positioned in a portion of the wellbore that is substantially horizontal in a region in which enhanced oil recovery techniques are being/have been applied.

In block 302, an EM source is positioned at the surface of the Earth at a first location. Optionally, an entire EM source array may be positioned at the surface of the Earth at the first location.

In block 304, the EM source (or optional source array) is activated for a first survey measurement. In block 306, the EM field detected at each EM receiver is recorded. At block 308, the EM source is repositioned at the surface of the Earth at a second location. In the embodiment in which an EM source array is employed, the array does not necessarily require repositioning. In various embodiments, when a plurality of EM sources (or array) are employed, the plurality of sources could be sequentially activated without repositioning, for a similar effect in survey measurements. In either case, the EM field detected at receiver is recorded.

Figure 4:
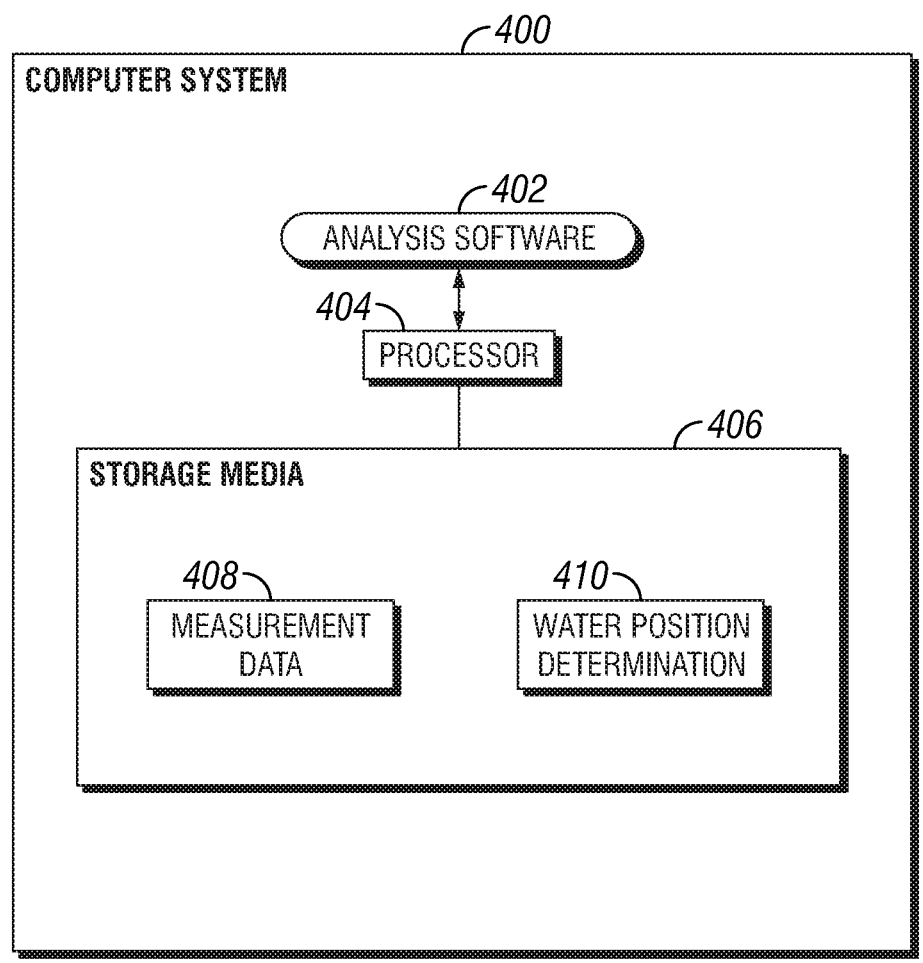
FIG. 4 illustrates a computer system 400 that can be used to perform tasks according to an embodiment of the present disclosure.

FIG. 4 illustrates a computer system 400 that can be used to perform some of the tasks above according to an embodiment. The computer system 400 includes analysis software 402 that is executable on a processor 404. The processor 404 is connected to storage media 406, which stores EM field measurement data 408 received from the EM receivers. The storage media 406 can be implemented with one or more disk-based storage devices or integrated circuit (IC) storage devices. Also, the storage media 406 stores determined water position based on the EM field measurement data 408.

The tasks that can be performed by the analysis software 402 include using measurement data 408 to perform inversion to determine the position of water about (and optionally below) the completed deviated well, which is then stored at 410.

Instructions of software described above (including the analysis software 402 of FIG. 4) are loaded for execution on a processor (such as processor 404 in FIG. 4). The processor includes microprocessors, microcontrollers, processor modules or subsystems (including one or more microprocessors or microcontrollers), or other control or computing devices. A "processor" can refer to a single component or to plural components (e.g., one or multiple central processing units in one or more computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method, comprising:
   a. positioning a series of electromagnetic (EM) receivers in a completed deviated wellbore, said receivers being spaced along substantially the length of the well located in a region of a reservoir to be monitored;
   b. positioning an electromagnetic (EM) source at a first Earth surface location;
   c. activating the EM source for a first survey measurement of the reservoir;
   d. recording an EM field detected at each EM receiver;
   e. moving the EM source to a second Earth surface location;
   f. activating the EM source for a second survey measurement of the reservoir;
   g. recording an EM field detected at each EM receiver; and
   h. from the first and second survey measurements at each of the receivers, performing an inversion to determine position of water about the horizontal well.

2. The method according to claim 1, further comprising permanently installing the series of EM receivers in the wellbore during completion.

3. The method according to claim 1, further comprising permanently installing the series of EM receivers in the wellbore after completion.

4. The method according to claim 1, further comprising deploying the series of EM receivers in the wellbore via a wireline deployment technique selected from the group consisting of a tractor, coiled tubing, and drill pipe.

5. The method according to claim 1, further comprising repeating steps c-h at a later point in time and performing an inversion to determine position of water below the deviated wellbore.

6. The method according to claim 1, wherein the deviated wellbore comprises a substantially horizontal wellbore.

7. The method according to claim 1, further comprising: a. positioning an array of EM sources at the Earth's surface; b. activating the array of EM sources for a survey measurement of the reservoir; c. recording an EM field detected at each EM receiver; and d. from the survey measurements recorded at each of the receivers, performing an inversion to determine position of water about the horizontal well.

8. The method according to claim 1, further comprising: a. towing the EM source; b. substantially continuously activating the EM source; c. substantially continuously recording an EM field detected at each EM receiver; and d. performing an inversion of the recorded EM fields from each EM receiver to determine position of water about the horizontal well.

* * * * *